US012764791B2

(12) United States Patent
Schuebel et al.

(10) Patent No.: US 12,764,791 B2
(45) Date of Patent: Oct. 13, 2026

(54) PHYSICAL LAYER COLLISION AVOIDANCE (PLCA) COORDINATOR REDUNDANCY

(71) Applicant: SEMICONDUCTOR COMPONENTS INDUSTRIES, LLC, Scottsdale, AZ (US)

(72) Inventors: Arndt Schuebel, Erding (DE); Piergiorgio Beruto, Genoa (IT)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 254 days.

(21) Appl. No.: 18/670,096

(22) Filed: May 21, 2024

(65) Prior Publication Data

US 2025/0365764 A1 Nov. 27, 2025

(51) Int. Cl.
*H04W 74/0816* (2024.01)

(52) U.S. Cl.
CPC ................................ *H04W 74/0816* (2013.01)

(58) Field of Classification Search
CPC .. H04W 74/0816; H04L 41/0663; H04B 3/04; H04B 3/46
See application file for complete search history.

(56) References Cited

U.S. PATENT DOCUMENTS

| | | | | |
|---|---|---|---|---|
| 10,925,097 | B2 | 2/2021 | Beruto et al. | |
| 2021/0377343 | A1* | 12/2021 | Kim | H04L 12/40039 |
| 2023/0135690 | A1 | 5/2023 | Beruto | |
| 2025/0132951 | A1* | 4/2025 | Michel | H04L 12/4035 |

OTHER PUBLICATIONS

Wikipedia, "PHY-Level Collision Avoidance," Retrieved from "https://en.wikipedia.org/w/index.php?title=PHY-Level_Collision_Avoidance&oldid=1191136334" on May 6, 2024, 2 pages.
Beruto et al., "802.3cg draft 2.0 PLCA (Clause 148) Overview," Canova Tech, IEEE 802.3 Plenary Meeting, San Diego (CA) 2018, 23 pages.
Zimmerman et al., "IEEE P802.3cg 10Mb/s Single Pair Ethernet: A guide," IEEE P802.3cg 10Mb/s Single Pair Ethernet Task Force—Jan. 2018 Interim, Long Beach, CA USA, 40 pages.
Beruto et al., "Locally Unique Mac Address Resolution," U.S. Appl. No. 18/177,043, filed Mar. 1, 2023, 18 pages.

* cited by examiner

*Primary Examiner* — Eric Myers
(74) *Attorney, Agent, or Firm* — Ramey LLP

(57) ABSTRACT

Methods and network interfaces are provided to equip network nodes with PLCA (Physical Layer Collision Avoidance) coordinator redundancy. One illustrative network interface includes: a transceiver configured to send and receive network data packets via a communications medium; and a PLCA controller configured to provide redundancy by causing the transceiver to transmit a beacon signal when detecting a transmit opportunity for a node ID that exceeds a total node count by an amount equal to a local node ID even when the local node ID is greater than zero. An illustrative network interface method includes: sending and receiving network data packets via a communications medium; and providing PLCA coordinator redundancy by sending a beacon signal when detecting a transmit opportunity for a node ID that exceeds a total node count by an amount equal to a local node ID even when the local node ID is greater than zero.

11 Claims, 3 Drawing Sheets

PHYSICAL LAYER COLLISION AVOIDANCE (PLCA) COORDINATOR REDUNDANCY

TECHNICAL FIELD

The present disclosure relates to access arbitration in multi-drop networks, and more particularly to network interfaces and methods providing transparent, backward-compatible redundancy for PLCA coordinators.

BACKGROUND

Carrier-sense multiple access with collision detection (CSMA/CD) is a technique that various network standards specify for network nodes to use when accessing a shared communications medium, and it is a fallback option provided in the recent IEEE Standard IEEE 802.3cg for 10 megabits per second Ethernet over a single twisted wire pair (10BASE-T1S), which shows great promise for use in automotive and industrial networking environments. The CSMA/CD technique undesirably suffers the well-known channel capture effect, in which the shared medium can be dominated by a single node, potentially causing bandwidth starvation for the other nodes.

More critical, however, is that in "noisy" environments such as automotive and industrial networks, the lower signal-to-noise ratio (SNR) of the channel makes it difficult for the nodes to distinguish a packet collision from ambient channel noise. This difficulty may cause nodes to prematurely terminate transmissions that could have been safely received in the absence of a real collision. The authors have observed situations in which a functional 10TBAS-T1S network ceases to operate when a CSMA/CD fallback occurs in a low SNR channel. It is desired to make such networks more robust against such failures.

SUMMARY

Accordingly, there are disclosed herein methods and network interfaces to provide network nodes with PLCA (Physical Layer Collision Avoidance) coordinator redundancy. One illustrative network interface includes: a transceiver configured to send and receive network data packets via a communications medium; and a PLCA controller configured to provide redundancy by causing the transceiver to transmit a beacon signal when detecting a transmit opportunity for a node ID that exceeds a total node count by an amount equal to a local node ID even when the local node ID is greater than zero.

An illustrative network interface method includes: sending and receiving network data packets via a communications medium; and providing PLCA coordinator redundancy by sending a beacon signal when detecting a transmit opportunity for a node ID that exceeds a total node count by an amount equal to a local node ID even when the local node ID is greater than zero.

An illustrative network node includes a network interface coupled to a host device, the network interface being configured to: send and receive network data packets via a communications medium; and provide PLCA coordinator redundancy by detecting a missing beacon condition and responsively sending a replacement beacon signal before a CSMA/CD fallback condition occurs.

Each of the foregoing network interface and method can be used in combination with one or more of the following optional features in any suitable combination: 1. the PLCA controller is configured to determine the node count by timing beacon signals sent by a remote node. 2. the PLCA controller is configured to use a default value as the total node count unless a programmed value is provided with allocation of the local node ID. 3. the PLCA controller is configured to detect transmit opportunities by counting symbol intervals after each beacon signal with pauses during any packets sent by remote nodes. 4. the communications medium is a single wire pair. 5. a PCS (physical coding sublayer) module, a PMA (physical media attachment) module, and a physical medium dependent (PMD) sublayer module, that are collectively configured to implement an IEEE 802.3cg 10BASE-T1S standard protocol. 6. the network interface detects the missing beacon condition by detecting a transmit opportunity for a node ID that exceeds a total node count by at least one.

DETAILED DESCRIPTION

It should be understood that the following description and accompanying drawings are provided for explanatory purposes, not to limit the disclosure. In other words, they provide the foundation for one of ordinary skill in the art to recognize and understand all modifications, equivalents, and alternatives falling within the scope of the claims.

Figure 1A:
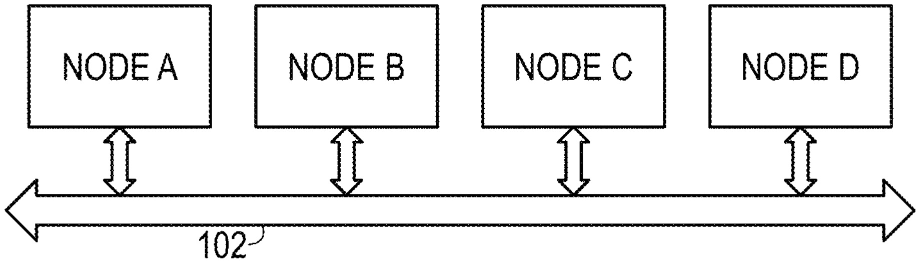
FIG. 1A is a block diagram of an illustrative network segment.

FIG. 1A shows an illustrative network having multiple network nodes (Node A through Node D) interconnected by a communications medium 102 such as an electrical bus or cabling, optical fiber, or radiofrequency signaling. Examples of network nodes include computers, network routers, network switches, network bridges, network storage, network-attached sensors, controllers, and IoT appliances. They include one or more network interfaces coupled to host devices such as processors, microcontrollers, electronic control units, or application specific integrated circuitry. The network nodes may employ a physical layer interface and communications protocol compliant with one of the IEEE 802 (network) standards such as IEEE 802.3 (Ethernet), 802.11 (wireless local area network), or 802.15 (wireless personal area network). Though the IEEE 802.3cg standard is used herein to illustrate network interfaces and methods providing PLCA redundancy, the disclosures provided herein are readily applicable to other communications media, network interfaces, and communications protocols employing beacon-synchronized access to the communications medium 102.

The illustrated communications medium 102 may carry network packets from one of the nodes to the remaining nodes. In certain preferred implementations, the communications medium 102 supports only one sender at a time. Multiple senders attempting to operate simultaneously may create network collisions that prevent reception of either packet or that are resolved in accordance with the standard for the relevant network protocol. Each network packet typically includes a data frame having a preamble, header, payload, checksum, and an inter-packet gap. The header may include a start delimiter, a destination field having the MAC address of the packet's desired destination, a source field having the MAC address of the packet's source node, and other fields for such information as optional tags, packet type, and payload length. In some implementations, the header further includes a field specifying a message type. When the destination field specifies the MAC address of a given node, the packet is a unicast message. For broadcast messages, the network protocol may provide a reserved MAC address to be used in the destination field to indicate that the packet is directed to all the nodes on the communications medium 102.

Figure 1B:
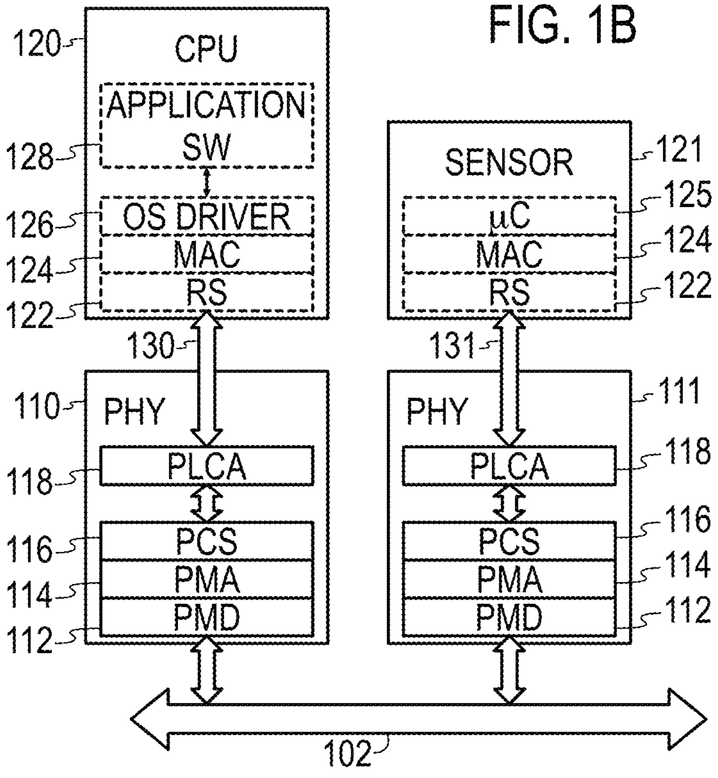
FIG. 1B is a block diagram for illustrative network nodes.

FIG. 1B provides additional detail for illustrative network nodes that may employ the communications medium 102. A first node includes a physical layer (PHY) network interface 110 that couples a first host device 120 to the communications medium 102. A second node includes a similar PHY network interface 111 that couples a second host device 121 to the communications medium 102. The first and second host devices are shown here as a central processing unit 120 and a sensor 121, respectively. The PHY network interfaces 110, 111, may be integrated circuits packaged as dedicated chips, or may be design blocks that are embedded into the chip or multi-chip module that contains the circuitry of the host device.

The IEEE 802.3cg standard employs a modified form of the ISO/IEC Model for Open Systems Interconnection (See ISO/IEC 7498-1:1994.1) architecture to specify operational details of the hardware and software components used to implement the networking protocol. FIG. 1B shows the relevant portions of the architecture as blocks within the PHY network interfaces 110, 111 and host devices 120, 121 of the illustrative network nodes. The illustrated blocks include a Physical Medium Dependent (PMD) Sublayer 112, a Physical Media Attachment (PMA) Sublayer 114, a Physical Coding Sublayer (PCS) 116, a Physical Layer Collision Avoidance (PLCA) controller 118, a Reconciliation Sublayer 122, and a Media Access Control (MAC) Sublayer 124. FIG. 1B also shows a microcontroller block 125 as part of host device 121, and as part of host device 120 shows an operating system (OS) driver 126 and application software 128.

The PMD Sublayer 112 represents the transceiver circuitry and connector contacts that convert an incoming channel signal to a receive bitstream (or where a larger signal constellation is supported) a receive stream of digital symbols) and converts a transmit bitstream (or a transmit stream of digital symbols) into an outgoing channel signal able to traverse the communications medium 102. The PMA Sublayer 114 represents circuitry that provides packet framing and channel symbol encoding for the transmit stream, and provides symbol/word synchronization, channel symbol decoding, and payload extraction for the receive stream. The PCS module 116 represents circuitry that applies a scrambling mask, provides channel encoding (to enable clock recovery and error detection), symbol redistribution, and PCS alignment marker insertion for the transmit stream. For the receive stream, the PCS circuitry removes the PCS alignment markers and reverses the symbol redistribution, channel encoding, and scrambling mask operations. To enable bit error rate estimation by the PHY network interfaces 110, 111, the PCS alignment markers may include Bit-Interleaved-Parity (BIP) values derived from the preceding bits in the stream up to and including the preceding PCS alignment marker The PLCA controller 118 circuitry controls packet transmission timing to implement coordinated access of the communications medium 102 as described further below. In at least some implementations, the PLCA controller 118 invokes the CSMA/CD functions (i.e., CRS carrier sense, COL collision detect) of the MAC sublayer 124 to control transmission timing of the host device. The PLCA controller 118 additionally monitors the receive stream for beacon signals that provide synchronization for the coordinated access and/or periodically generates such beacon signals for the transmit stream.

The MAC Sublayer 124 block represents circuitry provides flow control and multiplexing of the transmit stream, encapsulating the transmit data stream into packets with preamble, start delimiter, address information, padding if needed, a frame checksum, and space for an interframe gap. For the receive stream, the circuitry uses the checksum to detect and reject corrupted frames. Data payloads are extracted from valid frames and multiplexed receive streams are demultiplexed. The MAC Sublayer functions to isolate higher level software and firmware from the control complexities of the communications medium 102 and associated PHY network interfaces, enabling the host devices to access the network interfaces in a medium-independent manner. Microcontroller 125 can thus employ the MAC sublayer 124 to send data (such as acquired sensor data) and receive data (such as configuration data and commands or actuator control information) via the communications medium. OS driver 126 may represent a software function that can be similarly invoked by application software 128 to send and receive data via the communications medium.

Figure 2A:
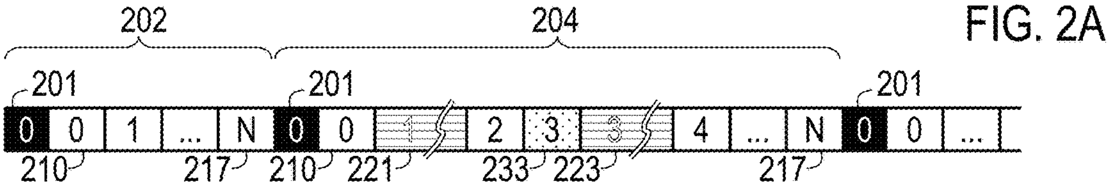
FIG. 2A is a timeline of two illustrative PLCA cycles.

The PLCA coordination process may be best understood with reference to a timeline such as that shown in FIG. 2A. The timeline is for transmissions on a communications medium 102 shared by N+1 nodes, each having a node ID in the range from 0 to N, inclusive. The node IDs may be assigned when the bus is initially configured or may be dynamically assigned as needed. Each node ID is unique. By default, the PLCA controller 118 in the node with Node ID 0 is the "PLCA Coordinator" responsible for maintaining coordination among the nodes sharing the communications medium 102, a responsibility it honors by periodically transmitting a beacon signal 201. Each beacon signal initiates a PLCA cycle that provides a sequence of N+1 transmission opportunities; one for each node beginning with a transmit opportunity 210 for Node 0 and ending with a transmit opportunity 217 for Node N. The transmit opportunities have a predetermined duration. The default is 32 bits or 8 symbol intervals, but the transmit opportunity duration is a configuration parameter that can be adjusted to other values. In PLCA cycle 202, none of the nodes seizes its allocated transmit opportunity and the cycle completes after transmit opportunity 217. Node 0 then transmits another beacon signal 201 to initiate a subsequent cycle 204.

In the example of FIG. 2A, two nodes seize their transmit opportunities in cycle 204. The first transmit opportunity 210 is allocated to Node 0, which does not seize it. The next transmit opportunity is allocated to Node 1, which seizes its opportunity by transmitting a network packet 221. The seizing of a transmit opportunity delays the subsequent transmit opportunities. The network packet 221 ends with an end-of-sequence delimiter, after which a transmit opportunity is provided for Node 2. Node 2 does not seize the transmit opportunity. The next transmit opportunity is allocated to Node 3, which seizes the opportunity by transmitting a commit signal 233 and a network packet 223. The subsequent transmit opportunities are delayed until packet 223 concludes with an end-of-sequence delimiter. Cycle 204 does not complete until each node has been provided a transmit opportunity. Once transmit opportunity 217 is provided for the last Node N, the PLCA controller of Node 0 sends a beacon signal 201 to initiate the next cycle.

The examples of FIGS. 2B-2E assume that the total node count is eight and that none of the nodes seize their transmit opportunities during the illustrated cycles. These assumptions are taken to save space and clarify the illustrations, but this is merely a convenience. It should be understood that the node count can be higher or lower and that the transmit opportunities are being provided to enable the nodes to use the communications medium 102 when they have network packets to send. The number of network packets that a given node can send in a given cycle is limited to prevent one node from dominating the communications medium. Additional details regarding the PLCA coordination process are available in the IEEE 802.3cg standard, the current version of which is hereby incorporated herein by reference.

Figure 2B:
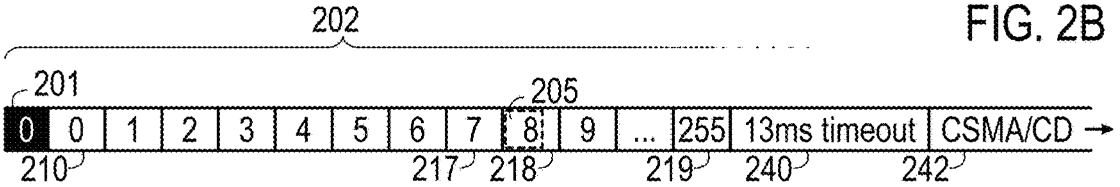
FIG. 2B is a timeline of an illustrative PLCA cycle leading to CSMA/CD fallback.

Node failure is an issue frequently encountered in networks, particularly in industrial or automotive settings where power signals are noisy and power transients are common. Power fluctuations, operational faults, or device defects may occasionally cause a node to lock up, reboot, or otherwise cease normal operations for at least a brief time. If Node 0 experiences such a failure, the standard provides an option for CSMA/CD fallback. FIG. 2B shows a timeline that may be associated with the fallback process. Node 0 transmits a beacon signal 201 to initiate PLCA cycle 202, but thereafter experiences a node failure preventing it from initiating the subsequent cycle. The absence of the missing beacon signal 205 after the transmit opportunity 217 for the last node causes the remaining nodes to continue counting transmit opportunities 218-219 for nonexistent node IDs 8 through the maximum node ID value 255. A 13-millisecond timeout period 240 precedes the fallback to CSMA/CD operation 242 where node access is uncoordinated and subject to collisions. In industrial or automotive settings or other environments where the communications medium has a relatively low signal-to-noise ratio, the nodes cannot reliably detect collision events, preventing network operations when PLCA coordination is lost.

Figure 2C:
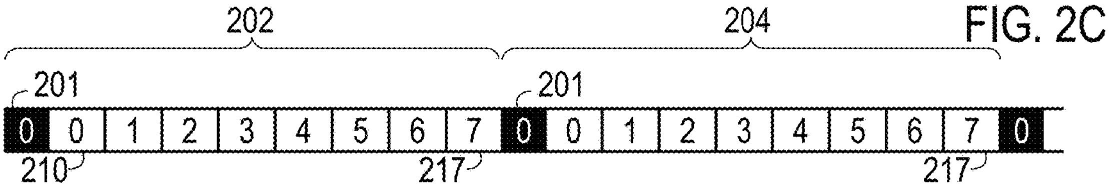
FIG. 2C is a PLCA timeline for an eight-node network segment.

To provide PLCA coordinator redundancy, one or more of the nodes (e.g., Node 1, Node 2) may be configured with PLCA controllers that supply replacement beacon signals when Node 0 fails. During normal operations, Node 0 supplies the beacon signals 201 as shown in FIG. 2C. Though Nodes 1 and 2 stand ready, they need not supply beacon signals while Node 0 functions normally.

Figure 2D:
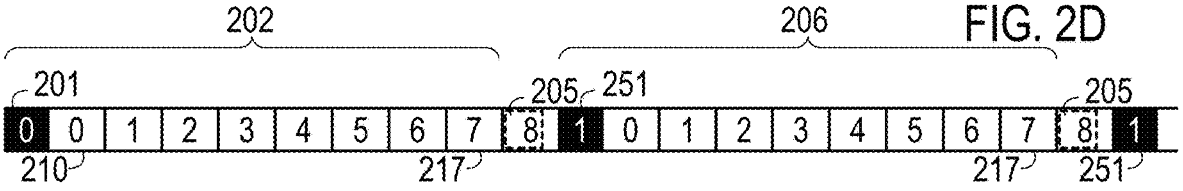
FIG. 2D is a PLCA timeline for a network segment with a failed PLCA coordinator.

FIG. 2D shows a timeline that begins with a beacon signal 201 from Node 0 but includes a transmit opportunity for a nonexistent Node 8 due to a missing beacon signal 205 from Node 0. Because Node 1 is configured for redundancy, it transmits a replacement beacon signal 251 after the first transmit opportunity for a nonexistent node, initiating a subsequent cycle 206. If the subsequent cycle again includes a transmit opportunity for a nonexistent node due to a missing beacon signal 205, Node 1 again provides a replacement beacon signal 251. In this fashion, the network continues to operate in coordinated PLCA fashion even when Node 0 fails.

Figure 2E:
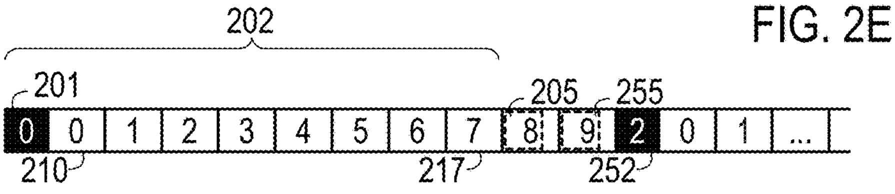
FIG. 2E is a PLCA timeline for a network segment with a failed PLCA coordinator and a failed backup coordinator.

The principle can be extended to enable PLCA operation even in the presence of multiple node failures. FIG. 2E shows a timeline that begins with a beacon signal 201 from Node 0, but includes two transmit opportunities for nonexistent nodes, Node 8 and Node 9. Because there is a missing beacon 205 from Node 0 and no replacement beacon 255 from Node 1, Node 2 provides a replacement beacon signal 252 after the second transmit opportunity for a nonexistent node.

The general rule may be expressed in terms of the total node count N+1 and the local node ID L: send a beacon signal when the current transmit opportunity is for node ID n=L+N+1. This rule ensures that when multiple PLCA controllers are configured for redundancy, their replacement beacon signals do not collide with each other. The current standard does not ensure any node other than Node 0 is configured with the total node count N+1, so the nodes configured to provide redundancy may need to determine the total node count themselves and/or the configuration process may be modified to provide each node with the total node count when configuring the Node IDs. The total node count can be readily determined by any node during normal operation of Node 0 by observing the node ID for the last transmit opportunity preceding a beacon signal. That node ID is N, one less than the total node count. In other implementations, Node 0 may transmit network packets with configuration information to each of the nodes. Other suitable methods can alternatively be employed while still enabling robust PLCA operation.

Figure 3:
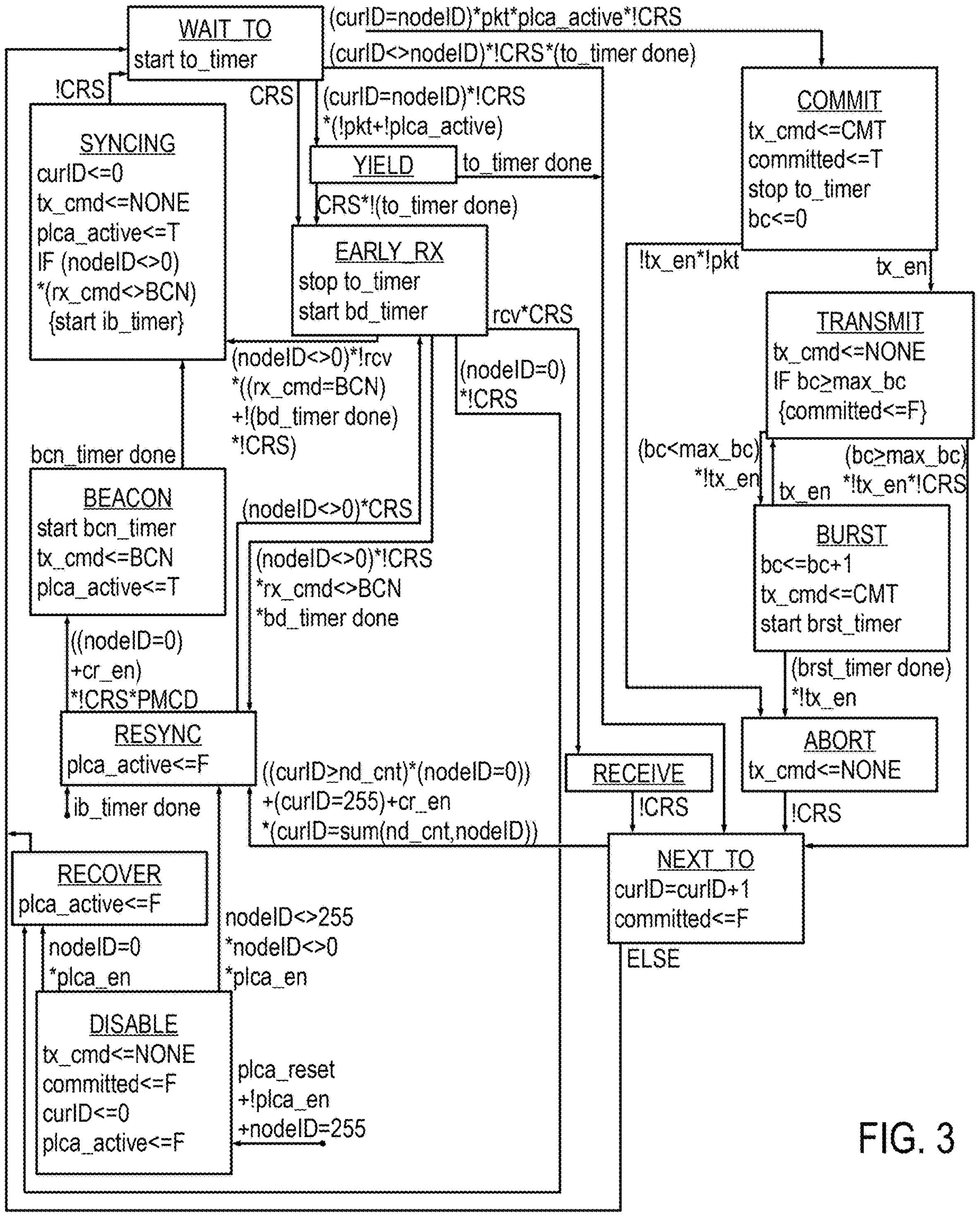
FIG. 3 is a state machine diagram for an illustrative PLCA controller that provides redundancy.

FIG. 3 shows a state machine diagram for an illustrative PLCA controller configured to provide redundancy. It is based on the PLCA Control State Diagram provided in FIGS. 148-3 and 148-4 in Article 148.4.4.6 of the hereby incorporated by reference standard IEEE Std 802.3cg-2019, but includes modifications to certain transitions to and from the Resync state. The modifications incorporate a coordinator redundancy enable signal cr_en. The coordinator redundancy signal may be a configuration register setting, or a status variable set by the controller once it has determined the total node count N+1.

As is common for state machines, the illustrated diagram can be implemented using registers and digital logic gates. The state machine diagram of FIG. 3 includes fourteen states: Disable, Recover, Resync, Beacon, Syncing, Wait_TO, Yield, Early_RX, Receive, Next_TO, Commit, Transmit, Burst, and Abort. They are described in the listed order below.

The Disable state is the initial state on boot up and the state to which the PLCA controller returns if the PLCA_reset signal is asserted, if the PLCA_en enable signal is de-asserted, or if the local node ID is set to 255. Certain variables are initialized in the Disable state including clearing the transmit command buffer tx_cmd, setting committed status to false, setting the node ID for the current transmit opportunity to zero, and setting the PLCA_active status to false. The committed status variable may be used to track whether the local node has seized its transmit opportunity. The PLCA_active status variable may be used to track whether a PLCA cycle is active, i.e., it has been initiated and has not expired. If the PLCA_en enable signal is asserted and the local node ID has been set to zero, the PLCA controller transitions to the Recover state. If the PLCA_en enable signal is asserted and the local node ID has a value other than zero or 255, the controller transitions to the Resync state.

The Recover state is a state used by the PLCA coordinator (the PLCA controller for Node 0) before coordination is established or after it has been lost. The PLCA_active status variable is set to false. From this state, the controller immediately transitions to the Wait_TO state.

The Resync state is a state used by the PLCA controllers for all nodes at the end of a PLCA cycle. It can also be reached when the invalid beacon timer ib_timer from the Syncing state expires. The PLCA_active status variable is set to false. From this state, the PLCA coordinator transitions to the Beacon state when the carrier sense signal CRS is de-asserted (indicating that the communications medium is free). Controllers for other nodes may also follow this transition to the Beacon state if the enable coordinator redundancy cr_en signal is asserted when the CRS signal is de-asserted. Timing of this transition is governed by the transmit data clock PMCD signal. Controllers for the nodes with the nonzero node ID may alternatively transition from the Resync state to the Early_RX state when the CRS signal is asserted (indicating the communications medium is conveying a signal).

The Beacon state is a state used by the PLCA controller for Node 0, or for the PLCA controllers with redundancy enabled, to transmit a beacon signal on the communications medium. The transmit command buffer is loaded with a beacon BCN signal to implement the transmission, the beacon timer bcn_timer is started, and the PLCA_active status variable is set to true. When the beacon timer elapses, the beacon transmission is complete and the controller transitions to the Syncing state.

The Syncing state is a state reached by the PLCA controllers immediately after the transmission or reception of a beacon signal via the communications medium. A current ID counter curID is set to zero for the first transmission opportunity (TO), the transmit command buffer tx_cmd is cleared, and the PLCA_active status variable is set to true. For controllers with nonzero node IDs, the controller starts an invalid beacon timer ib_timer if the receive command buffer rx_cmd does not contain a beacon signal. From the Syncing state, the controllers transitions to the Wait_TO state when the carrier sense signal CRS is de-asserted.

The Wait_TO state is a state reached by the PLCA controllers at the beginning of each transmit opportunity. The controllers set a transmit opportunity timer to_timer corresponding to the predetermined duration of the transmit opportunity. If the local node ID nodeID matches the current ID counter of the current transmit opportunity and the packet pending signal pkt is asserted while the PLCA_active status variable is true and the carrier sense signal CRS is de-asserted (indicating the communications medium is free), the controller transitions to the commit state. If the current ID counter matches and the carrier sense signal CRS is de-asserted but the packet pending signal pkt is de-asserted or the PLCA_active status variable is false, the controller transitions to the Yield state. If the current ID counter does not match the local node ID and the transmit opportunity timer to_timer elapses while the carrier sense signal is de-asserted, the controller transitions to the Next_TO state. If the carrier sense signal CRS is asserted at any point during the transmit opportunity, the controller transitions to the Early_RX state.

The Yield state is a state reached by the PLCA controllers when the node ID for the current transmit opportunity matches the local node ID, but the controller is yielding the transmit opportunity either because there is no pending data packet or because the PLCA_active status variable has been de-asserted. If the carrier sense signal CRS is asserted while the controller is in this state, the controller transitions to the Early_RX state. Otherwise the controller exits this state when the transmit opportunity timer to_timer elapses and transitions to the Next_TO state.

The Early_RX state is a state reached by the PLCA controller when remote transmission activity is detected on the communications medium. In this state, the controller stops the transmission opportunity timer to_timer and starts a beacon detection timer bd_timer. If the transceiver asserts a receiving signal rcv (indicating a data packet rather than, say, a beacon signal, is being received), the controller transitions to the Receive state. If the controller is part of Node 0, and the carrier sense signal CRS is de-asserted with assertion of the receiving signal rcv, the controller transitions to the Recover state. For the other nodes, if the receiving signal rcv is de-asserted before the beacon detection timer bd_timer expires and the receive command buffer rx_cmd contains a beacon signal, the controller transitions to the Syncing state. If the beacon detection timer bd_timer expires without a beacon signal in the receive command buffer rx_cmd, the controller transitions to the Resync state.

The Receive state is a state reached by the PLCA controller when a network packet is being received. The controller transitions to the Next_TO state once the carrier sense signal CRS is de-asserted, indicating the communications medium is free.

The Next_TO state is a state reached by the PLCA controller when the current transmit opportunity expires. The current ID counter curID is incremented for the now-current transmit opportunity, and the committed status variable is set to false. If the controller is part of Node 0 and the current ID counter curID equals or exceeds the total node count N+1, or if the current ID counter reaches 255, or if the coordinator redundancy enable signal cr_en is asserted and the current ID counter curID equals the sum of the total node count with the local node ID nodeID, the controller transitions to the Resync state. Otherwise, the controller promptly transitions to the Wait_TO state.

The Commit state is a state reached by the PCLA controller when the local transmit node has a network packet pending and the transmit opportunity's current ID counter matches the local node ID nodeID. The controller sets the transmit command buffer to send a commit signal CMT to seize the transmit opportunity, sets the committed status variable to true, stops the transmit opportunity timer to_timer, and initializes the burst count variable bc to zero. If the host device is asserting the transmit enable signal tx_en, the controller transitions to the Transmit state. If the transmit enable signal is not asserted and the packet pending signal pkt becomes de-asserted, the controller transitions to the Abort state.

The Transmit state is a state reached by the PLCA controller when the transceiver is transmitting a network packet via the communications medium. The transmit command buffer is cleared. If the burst counter is equal to or greater than the burst count limit max_bc, the committed status variable is set to false. If the transmit enable signal tx_en is de-asserted by the host device while the burst count bc is less than the burst count limit max_bc, the controller transitions to the Burst state. If the burst count bc equals or exceeds the burst count limit max_bc, the controller transitions to the Next_TO state once the transmit enable signal tx_en is de-asserted and the carrier sense signal CRS indicates the medium is free.

The Burst state is a state reached by the PLCA controller when the host device pauses after a network packet but remains entitled to send another network packet during the current transmit opportunity. The controller increments the burst count bc, populates the transmit command buffer with a commit signal CMT, and starts a burst timer brst_timer. When the transmit enable signal tx_en is asserted, the controller returns to the Transmit state. If the burst timer brst_timer expires while the transmit enable signal remains de-asserted, the controller transitions to the Abort state The Abort state is a state reached by the PLCA controller when the host device is unable to deliver a pending packet in time for the current transmit opportunity. The controller clears the transmit command buffer tx_cmd. Once the carrier sense signal CRS indicates the communications medium is again idle, the controller transitions to the Next TO state.

Upon reviewing the above disclosure, those of ordinary skill in the art will recognize various modifications, equivalents, and alternatives as being within the scope of the disclosure. It is intended that the following claims be interpreted to embrace all such modifications, equivalents, and alternatives where applicable.

What is claimed is:

1. A network interface that comprises:

a transceiver configured to send and receive network data packets via a communications medium; and a PLCA (Physical Layer Collision Avoidance) controller configured to provide redundancy by causing the transceiver to transmit a beacon signal when detecting a transmit opportunity for a node ID that exceeds a total node count by an amount equal to a local node ID, the local node ID being greater than zero.

2. The network interface of claim 1, wherein the PLCA controller is configured to determine the node count by timing beacon signals sent by a remote node.

3. The network interface of claim 1, wherein the PLCA controller is configured to use a default value as the total node count unless a programmed value is provided with allocation of the local node ID.

4. The network interface of claim 1, wherein the PLCA controller is configured to detect transmit opportunities by counting symbol intervals after each beacon signal with pauses during any packets sent by remote nodes.

5. The network interface of claim 1, wherein the communications medium is a single wire pair.

6. The network interface of claim 5, further comprising a PCS (physical coding sublayer) module, a PMA (physical media attachment) module, and a physical medium dependent (PMD) sublayer module, that are collectively configured to implement an IEEE 802.3cg-2019 10BASE-T1S standard protocol.

7. A network interface method that comprises:

sending and receiving network data packets via a communications medium; and providing PLCA coordinator redundancy by sending a beacon signal when detecting a transmit opportunity for a node ID that exceeds a total node count by an amount equal to a local node ID, the local node ID being greater than zero.

8. The network interface method of claim 7, further comprising: using the timing of beacon signals from a remote node to determine the total node count.

9. The network interface method of claim 7, further comprising: using a default value as the total node count unless a programmed value is provided with allocation of the local node ID.

10. The network interface method of claim 7, wherein as part of detecting the transmit opportunity, the method includes counting symbol intervals after each beacon signal with pauses during any packets sent by remote nodes.

11. The network interface method of claim 7, wherein the communications medium is a single wire pair.

* * * * *